K. V. BENNIS.
SHOCK ABSORBER.
APPLICATION FILED JULY 8, 1912.
1,063,641.
Patented June 3, 1913.
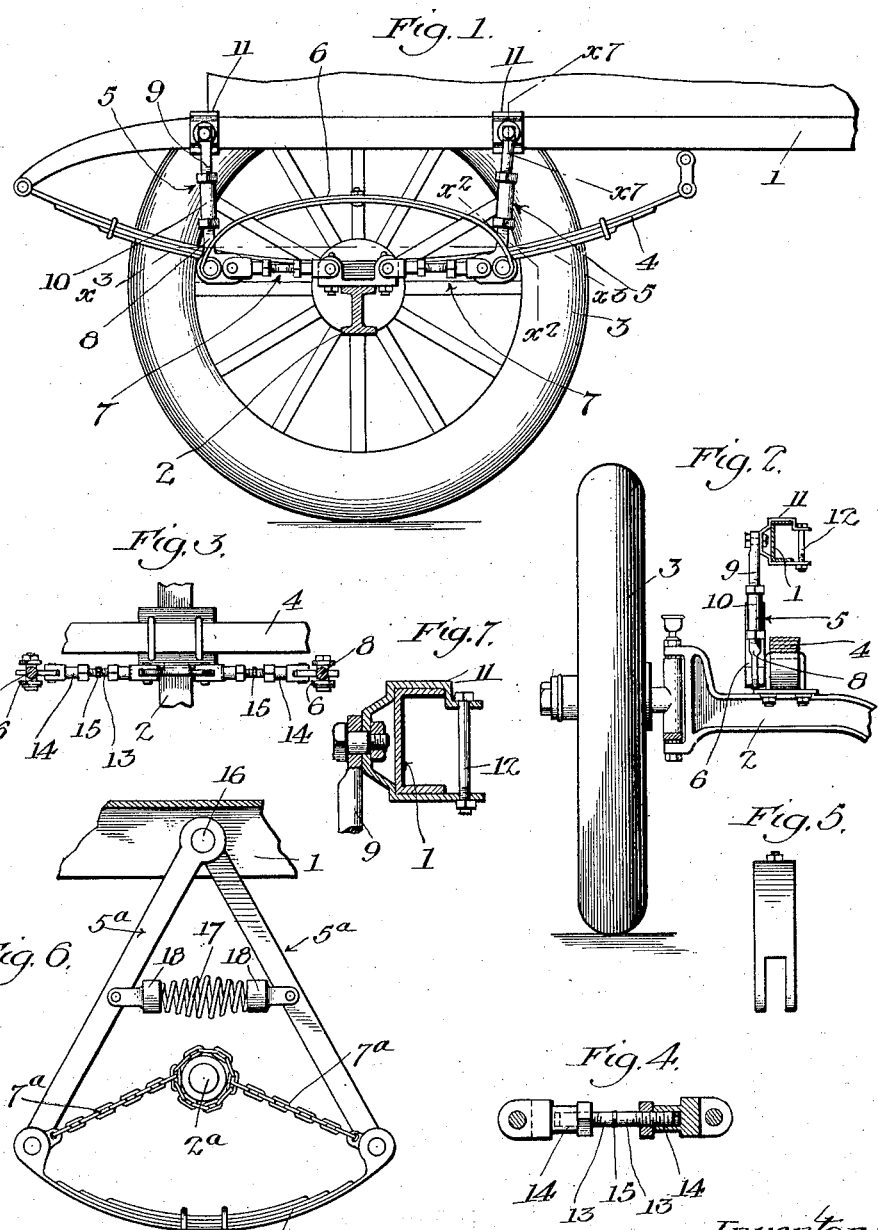
Witnesses:
Inventor:
Karl V. Bennis

UNITED STATES PATENT OFFICE.

KARL V. BENNIS, OF LOS ALAMITOS, CALIFORNIA.

SHOCK-ABSORBER.

1,063,641.  Specification of Letters Patent.  Patented June 3, 1913.

Application filed July 8, 1912. Serial No. 708,381.

*To all whom it may concern:*

Be it known that I, KARL V. BENNIS, a citizen of the United States, residing at Los Alamitos, in the county of Orange and State of California, have invented a new and useful Shock-Absorber, of which the following is a specification.

This invention relates to shock absorbers and one of the main objects of the invention is to provide for cushioning the movement of the vehicle frame in both directions relatively to the axle, the spring means employed for accomplishing this, serving to operate to cushion the movement in both directions.

Another important object is to provide such a construction that the spring when cushioning the movement in both directions will be exposed to the same stresses, that is to say, the coil spring employed will act as a compression spring in cushioning both the upward movement of the frame and the downward movement of the frame. Likewise, if the flat leaf spring be also employed, the latter will be sprung in the same direction in cushioning the movement of the frame either up or down.

Another advantage of the invention is that the shock absorber will act in the capacity of auxiliary springs, supplementing the supporting qualities of the regular springs.

Referring to the drawings: Figure 1 is a sectional view through the frame of the vehicle, looking toward one end of the axle and showing the wheel, regular spring, and shock absorber in elevation. Fig. 2 is a side elevation, showing the shock absorber in the position it has when the frame is moved downwardly with respect to the axle. Fig. 3 is a section on line $x^3$—$x^3$, Fig. 1. Fig. 4 is a side elevation partly in section of a radius member. Fig. 5 is an end elevation of the leaf spring. Fig. 6 is a side elevation of the shock absorber, showing a modified form. Fig. 7 is a sectional view on line $x^7$—$x^7$, Fig. 1.

1 designates the frame of the vehicle, 2 is the axle, and 3 the wheel.

4 is the regular spring.

The shock absorber consists of two rod members 5, pivoted to the frame and at their lower ends connected to opposite ends of a spring 6. The lower ends of the members 5 are held at a fixed distance from the axle 2 by radius members or connections 7 which permit the lower ends of members 5 to move in circular paths. The members 5 as shown in Fig. 1 are preferably extensible, consisting of two threaded rods 8 and 9, united by a threaded sleeve 10 provided with right and left threads, whereby when turned, it will vary the distance between the rods 8 and 9 and thus regulate the length of connections 5. The connections 5 may be attached to the frame 2 at separate points, as shown in Fig. 1, or they may be pivotally connected at a single point as shown in Fig. 6. When connected as shown in Fig. 1, each rod 9 is pivoted to a bracket 11 shown in detail in Fig. 7, which is securely clamped over the frame 2 by a bolt 12. This form of connection obviates the necessity of drilling the frame, thereby retaining full strength of the frame, and also enabling the shock absorbers to be readily attached without any machining operation. The clamps 11 may be adjusted longitudinally of the frame 2 to the desired point, and then the bolts 12 tightened. The members 7 are also adjustable in length, each member consisting of a rod 13 having right and left threads as shown in Fig. 4, the ends of the rod 13 engaging in threaded shackle members 14. The rod 13 has a flattened portion 15 enabling it to be turned by a wrench to adjust the distance between the shackle members 14.

In the form shown in Fig. 6, the two members $5^a$ are both pivoted at a single stud 16 on the frame 1, and the spring $6^a$ which is pivotally connected with the lower ends of bar $5^a$ extends below the axle $2^a$. In this form, I have also shown chains $7^a$ which are employed in place of the connections 7 of the previous form. A compression spring 17 is arranged between the members $5^a$, its ends being seated in cupped spring seats 18, pivoted to the members $5^a$. It will be understood that in the normal position of the parts, the chains $7^a$ extend horizontally so that the springs $6^a$ and 17 are then in most released position, and on movement either up or down from this position, the chains $7^a$ draw the bars $5^a$ inwardly and compress the springs.

In operation, the members 7 normally stand in horizontal position as shown in Fig. 1. When the frame 2 of the vehicle moves down, the outer ends of members 7 are swung downward in a circular path and the spring 6 is bent and placed under a greater tension. This spring resistance prevents shock to the frame and cushions its downward movement. At the same time the weight of the frame and body of the vehicle is obviously mainly carried by the springs 4, the spring 6 serving as an auxiliary cushioning agent. When the frame 1 moves upwardly from the axle 2, the outer ends of member 7 are swung upwardly in a circular path toward each other, thereby again bending the spring 6 in the same direction as during the downward motion of the frame, so that the spring 6 acts to absorb the shock during the upward movement of the frame, as well as the downward movement. The spring 6 acts in the same capacity at both times and is bent in the same direction whether the frame moves downwardly or upwardly.

In the form shown in Fig. 6, the operation is the same, downward movement of the frame 1 moving the parts into the position shown in Fig. 6, in which figure, the parts are shown in their extreme lower position. As the frame 2 moves up, the lower ends of the members 5$^a$ are carried in circular paths of which axle 2 is the center, and while the chains 7$^a$ are swinging toward a horizontal position, the lower ends of members 5$^a$ move outwardly, reducing the tension on spring 6$^a$, but continued upward movement of frame 2 results in the chains 7$^a$ drawing the lower ends of members 5$^a$ closer together as the chains 7$^a$ swing above a horizontal position, and as the members 5$^a$ swing together, they bend the spring 6$^a$ and the latter cushions the upward rebound of frame 2. The spring 17 acts to cushion the movement of members 5$^a$ as they move toward each other, but this spring is not an essential feature and may be omitted.

The shock absorber may be adjusted to give the same resistance to the upward movement as to the downward movement, or, it may be adjusted to give greater resistance to the downward movement than the upward movement, or, vice versa. Thus, moving the upper ends of rod members 5 toward each other will give greater resistance to the downward movement of the frame, while when the rod members are substantially or nearly vertical as in Fig. 1, the upward and downward resistance is practically the same, because the relations of the lower spring pivots of the rod members to their pivotal connections with members 7 is the same during both movements. When the upper ends of rod members 5 are adjusted closer together, the resistance is greater as the frame 1 moves down. On the other hand, when the upper ends of members 5 are moved farther apart than shown in Fig. 1, the resistance is less as the frame moves down.

The connecting of the spring 6 to the rod members at the point outside or concentric to the pivotal connection of the radius members to said rod members is of advantage in that it increases this regulating action on the spring, for the reason that when the body moves downwardly, the connection of the rod member to the radius member and at the same time, the last named pivotal connection moves about the pivotal connection of the radius member to the axle, so that a double motion is secured, tending to compress the spring 6.

What I claim is:

1. A vehicle body, an axle, radius members pivoted to the axle and normally extending horizontally in opposite directions from the axle, rod members pivotally connected to the body and extending downwardly therefrom and pivotally connected at their lower ends to the radius members, and a compression spring connected to said downwardly extending rod members to resist by its compression, angular movement of the radius members in either direction from the horizontal position.

2. In combination with a vehicle body and an axle, of shock absorbing means connected to said body and axle, and comprising rod members pivotally connected to the body, a compression spring connected to said rod members and radius members connected to the axle and to the rod members and extending normally in line with one another and with the line of action of the spring and at right angles to the rod members.

3. The combination with a vehicle body and an axle, of shock absorbing means connecting said body and axle and comprising rod members pivotally connected with the body, and provided with means for adjusting the length thereof, a compression spring connected to said rod members, and radius members pivotally connected to the axle and to said rod members, said radius members being normally in line with one another and with the line of action of the spring thereon.

4. In combination with a vehicle body and an axle, of shock absorbing means connecting said body and axle, comprising rod members pivotally connected to the vehicle body and adjustable longitudinally with relation to said body, so as to enable their pivotal connections to the body to be brought nearer together, or farther apart, a compression spring connected to said rod members and radius members pivotally connected to the axle and to the rod members, said radius members normally extending in alinement with each other and with the line of action with the spring thereon.

5. In combination with a vehicle body and an axle, of shock absorbing means therefor, comprising rod members pivotally connected to the body, a compression spring connected to said rod members and radius members pivotally connected to the axle and to said rod members, said radius members being normally in line with each other and with the line of action of the spring thereon, and said radius members being adjustable in length.

6. In combination with a vehicle body and an axle, of shock absorbing means therefor, comprising rod members pivotally connected to the body, a compression spring connected to said rod members and radius members pivotally connected to the axle and to said rod members, said radius members being normally in line with each other and with the line of action of the spring thereon, the connection of the spring to the rod members being eccentric to the connection of the rod members with the radius members.

7. In combination with a vehicle body and an axle, of shock absorbing means therefor, comprising rod members pivotally connected to the body, radius members pivotally connected to the axle and to said rod members, and a flat leaf spring connected at its ends at the joints between radius members and rod members, the spring being unsupported at all other points.

In testimony whereof, I have hereunto set my hand at Los Alamitos, California this 1st day of July 1912.

KARL V. BENNIS.

In presence of—
GEO. T. HACKLEY,
MARTHA M. LANGE.